Jan. 14, 1964   C. O. KING   3,117,389
FISH LURE
Filed June 5, 1961
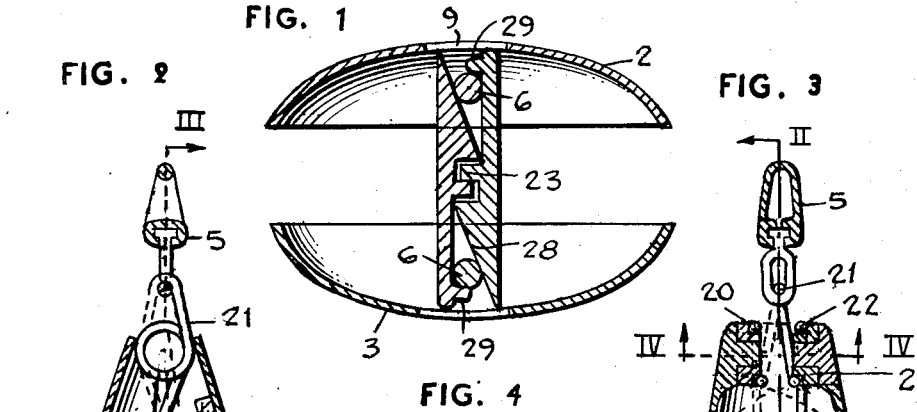
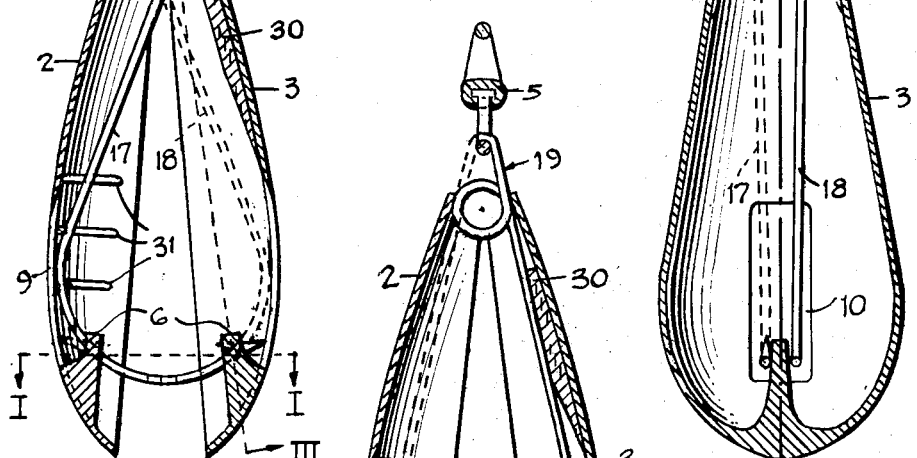
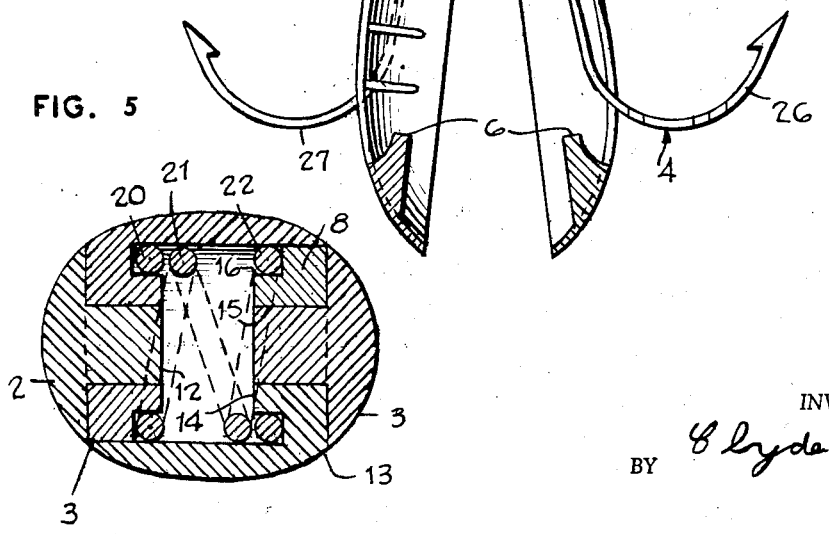
INVENTOR.
BY Clyde O. King

3,117,389
FISH LURE
Clyde O. King, 4055 Utah St., San Diego, Calif.
Filed June 5, 1961, Ser. No. 127,418
4 Claims. (Cl. 43—35)

This invention relates to a fish lure consisting of only three operative members and an attaching swivel. Two of said members are identical clam shell-like body members having smooth exteriors. One of said body members may be provided with a float to hold the lure upright in water and the other body may be provided with bait holding means on its inner surface for attaching an aromatic fish bait. The third member of the lure is a double fish hook which includes a spring which urges the hook outwardly. In operation, when a fish strikes the lure the body members are squeezed together, thereby triggering the spring urged hooks which move forceably outwardly of the body members into the fish.

The fish lure is so constructed that it may be quickly and easily assembled.

This invention is an improvement of the fish lure described in Patent No. 2,976,639 of March 28, 1961, filed on September 28, 1961.

Referring to the drawing forming part thereof:

FIG. 1 is an enlarged cross-sectional view of the lure in set position taken along the line I—I in FIG. 2.

FIG. 2 is a cross-sectional view of the lure in set position taken along the line II—II in FIG. 3.

FIG. 3 is a cross-sectional view of the lure in set position taken along the line III—III in FIG. 2, the float being omitted.

FIG. 4 is a cross-sectional view of the lure similar to FIG. 2 in sprung position.

FIG. 5 is an enlarged cross-sectional view taken at line IV—IV in FIG. 3.

Referring more particularly to the drawing, which illustrates one embodiment of the invention, the fish lure comprises two clam shell-like body members 2, 3, a double ended fish hook 4 and a swivel 5. The clam shell-like body members 2, 3, are substantially identical in form which permits the lure to be made at low cost since only one die is needed to form both halves of the body. Each body member has a generally ovate exterior and a concave inner surface. The lower inside surface of each body member is comprised with an integral upstanding post 6 spaced from the inside surface. The body members are each provided with an opening 9, 10 approximately at the same height as the post and being positioned to allow passage of the barbs 24, 25 when the fish lure is attacked by a fish.

The upper end of each body member 2 and 3 is divided into two pivot arm portions 7 and 8. One portion 7 of each body member is provided with an inner planar surface 11 having a circular stud 12 projecting therefrom. The other portion 8 of each body member having an outer planar surface 13 and an inner planar surface 14. The other portion 8 having a circular aperture 15 in alignment with the stud and having a diameter substantially equal to the diameter of the stud 12. In assembled postion, the surface 11 of each body member is in contact with the surface 13 of the other body member and the stud 12 of each body member is disposed in the aperture 15 of the other body member to provide a pivotal connection between the two body members 2, 3. The surface 14 of each portion 8 has a shallow recess 16 in concentric spaced relation to the aperture 15.

The double-ended fish hook 4 is composed of two shanks 17, 18 having barbs 24, 25 their outer ends. The inner ends of the shanks being integrally connected by coil spring means 19. Said coil spring containing three coils 20, 21, 22. The central coil 21 having a portion extending upwardly away from the shanks 17, 18 to provide means for the attachment of the swivel 5. The outer coils 21, 22 are circular in form and are of a size which allows them to fit into the shallow recesses 16.

To assemble the lure the body members are positioned so that the portion 8 of one body member lies between portions 7 and 8 of the other body member. The body members 2, 3 are then moved laterally so that the studs 12 slide axially into apertures 15. The coils of the spring 19 are then axially compressed so that it can be moved laterally between the surfaces 14 and the ends of the studs 12 and allowed to expand into the shallow recesses 16.

Each shank 17, 18 of the hook 4 is provided with a bight portion 26, 27. The adjacent sides of the bight portions 26, 27 are each formed with a projection 23 which interengages to hold the bight portions in side by side relationship against the urging of the coil spring 19. The sides 28 of the portion of the bight toward the barb of the hook being partly inclined so that the edge of the side 28 nearest the projection 23 extends laterally further than do the projections. The adjacent side of the bight across the projection 23 away from the barbs being provided with a detent 29, so that when the projections 23 are interengaged the detents 29 snugly embrace the posts 6, 6 to prevent the body members from freely swinging about the pivot.

In operation, a fish attacks the body members 2, 3 by squeezing them together. This movement results in the posts 6, 6 moving toward each other along the inclined surfaces 28 which causes the bight portions 26, 27 to move apart until the projections 23 disengage. At this time the barbs 24, 25 are forceably moved apart and into the flesh of the fish due to the urging of the coil spring 19.

One of the body members 3 may further be provided with a float 30 formed of cork or similar material so that the body member 3 containing the float will be above the body member 2 when the fish lure is in water. This results in the barbs being projected in a vertical plane when the lure is sprung so that the barbs will pass through the jaws of the fish rather than through the sides of the fish's mouth.

The inner surface of body member 2 may further be provided with barbs 38 to hold an aromatic bait to attract fish to the lure. By placing the aromatic bait inside the lure it is not left out in the open where it can be nibbled away by small fish.

While a single embodiment of the invention has been shown and described herein, it is to be understood that the invention embraces other modifications falling within the scope of the appended claims.

I claim:

1. A fish lure comprising a pair of clam shell-like body members and a double fish hook, said body members being substantially identical, each body member having a thin wall with a smooth convex exterior and a concave interior, one end of each body member having a pair of spaced pivot arm projections, one of said portions having a circular stud projecting toward the other portion and said other portion having a circular opening aligned with and having the same diameter as the stud, said other portion further having an annular groove concentric with said opening and being spaced therefrom, said double hook having a pair of bight portions and oppositely projecting hooks which are integrally connected by a pair of shanks and a spring having three aligned annular coils, said bight portions having interengaging projections and inclined surfaces on their adjacent surfaces when said bight portions are in overlapping set position, when the lure is assembled the studs of each body member are located in the openings of the other body member and the outer annular coils of the spring are located in the annular grooves, said body members having an aperture adjacent the free end of each hook and a post positioned between the bight portions adjacent said inclined surface, whereby when said lure is in set position, and said body portions are moved together, the posts move along the inclined surfaces forcing the bight portions apart until the projections disengage, whereupon the hoops are forceable moved through the apertures due to the urging of the spring.

2. A fish lure as set forth in claim 1 wherein one of said body members contains a bouyant float member whereby the lure will float with the hooks being positioned in a vertical plane.

3. A fish lure as set forth in claim 2 wherein the inner surface of the other body member contains means for holding aromatic bait so that it may not be nibbled upon by small fish.

4. A fish lure as set forth in claim 3 wherein a swivel is attached to the center coil of the spring for attaching a fishing line.

References Cited in the file of this patent

UNITED STATES PATENTS

| | | |
|---|---|---|
| 1,312,824 | Boman | Aug. 12, 1919 |
| 1,393,617 | Frame | Oct. 11, 1921 |
| 1,462,949 | Walls | July 24, 1923 |
| 1,464,215 | Olson | Aug. 7, 1923 |
| 2,976,639 | King | Mar. 28, 1961 |